United States Patent [19]
Makita

[11] Patent Number: 5,815,328
[45] Date of Patent: Sep. 29, 1998

[54] LENS ACTUATOR AND OPTICAL DISK APPARATUS

[75] Inventor: Akihiko Makita, Kawasaki, Japan

[73] Assignee: Fujitsu Limited, Kawasaki, Japan

[21] Appl. No.: 638,221

[22] Filed: Apr. 26, 1996

[30] Foreign Application Priority Data

Sep. 14, 1995 [JP] Japan .................................. 7-237317

[51] Int. Cl.[6] .................................................. G02B 7/02
[52] U.S. Cl. ........................ 359/824; 359/822; 359/821; 359/813; 369/44.18
[58] Field of Search ...................... 359/813, 814, 359/823, 824, 821, 822; 369/44.18, 44.19, 44.21

[56] References Cited

U.S. PATENT DOCUMENTS

| 3,631,775 | 1/1972 | Tidd | 359/821 |
| 4,321,700 | 3/1982 | Russell | 369/44.18 |
| 4,544,236 | 10/1985 | Endo | 359/821 |
| 4,591,239 | 5/1986 | Nakamura | 359/821 |
| 5,128,808 | 7/1992 | Dosaka | 359/821 |
| 5,132,850 | 7/1992 | Hagiwara | 359/813 |

FOREIGN PATENT DOCUMENTS

| 354740 | 8/1991 | Japan . |
| 6333255 | 2/1994 | Japan . |

OTHER PUBLICATIONS

Komma et al., "Dual focus optical head for 0.5mm and 1.2mm disks(1)" Association of Applied Physics 19P–S–4 1994.

*Primary Examiner*—Loha Ben
*Attorney, Agent, or Firm*—Greer,Burns & Crain, Ltd.

[57] ABSTRACT

A lens actuator in an optical disk apparatus, wherein a rotation drive unit rotates a lens holder including a plurality of objective lenses which have different optical characteristics from each other, and which are disposed on a circumference whose center coincides with an axis of rotation of the lens holder to thereby switch the objective lenses and place an objective lens [to] in a predetermined position.

17 Claims, 15 Drawing Sheets t:1.2mm

λ:785,685nm
NA:0.55 t:1.2mm

λ:780nm
NA:0.45 t:0.6mm

λ:685nm
NA:0.6 t:0.6mm

λ:635,650nm
NA:0.55

LENS ACTUATOR AND OPTICAL DISK APPARATUS

BACKGROUND OF THE INVENTION

1. Field of the Invention

The present invention relates to a lens actuator which switches the position of a plurality of objective lenses to position one of the objective lenses in a predetermined position and fine-adjusts the objective lens which is positioned at the predetermined position in a direction which is parallel to an optical axis of the objective lens or in a direction which is perpendicular to the optical axis, and to an optical disk apparatus comprising the same.

2. Description of Related Art

In an optical disk apparatus, laser light passes through an objective lens to be converged and projected on an optical disk surface. A record mark is then formed in correspondence with data to be recorded on the optical disk surface by an optical or a magneto-optical method. Refelction light from the optical disk surface is converged and extracted by a lens and converted into data for reproduction.

Hence, to position a focal point of an objective lens at the optical disk surface and to change the focal position to follow a track along the optical disk, the objective lens is held by a lens actuator which has both a focusing function and a tracking function, so that the position of the objective lens is adjusted.

There are various types of lens actuators proposed. FIG. 1 is an exploded perspective view showing a lens actuator of an axial slide type, i.e., one of those various types. A guide shaft 42 is disposed upright on a base 41, and a lens holder 43 is slidably fitted with the guide shaft 42 so as to be rotatable and axially movable.

The lens holder 43 is structured as described below. A shaft hole 43b with which the guide shaft 42 slidably fits is formed in the center of a support pedestal 43a which has an approximately rhombus shape. An objective lens 43c is disposed at one end of the support pedestal 43a while a balance weight 43d is disposed at the other end of the support pedestal 43a. A cylindrical portion 43e is fixed to a bottom surface of the support pedestal 43a to be concentrical with the shaft hole 43b. A focusing coil 43f is wound around an outer periphery of the cylindrical portion 43e, two tracking coils 43g facing each magnet $M_3$ are fixed on a surface of the focusing coil 43f with generally constant intervals in a circumferential direction.

In addition, on the base 41, a cylindrical member 45 which forms a yoke around the guide shaft 42 is disposed upright to be concentrical with the guide shaft 42. Support columns 44 are disposed upright at two positions in a diameter direction of the cylindrical member 45 on the base 41. The magnets $M_3$ are fixed at positions on the upper side of the support columns 44 to face the focusing coil 43f and the tracking coils 43g when the guide shaft 42 is fitted into the shaft hole 43b of the lens holder 43.

In this lens actuator, when the guide shaft 42 is fitted into the shaft hole 43b of the lens holder 43, the cylindrical member 45 is positioned inside the cylindrical portion 43e of the lens holder 43 while the support columns 44 and the magnets $M_3$ are positioned outside the cylindrical portion 43e of the lens holder 43. As a result, the cylindrical member 45 is inside the cylindrical portion 43e faces with the support columns 44 and the magnets $M_3$ being outside the cylindrical portion 43e. The focusing coil 43f and the tracking coil 43g are sandwiched between the magnets $M_3$ the cylindrical member 45, thereby forming a magnetic circuit. A current flow selectively in one of the focusing coil 43f and the tracking coils 43g causes the objective lens 43c to perform a focusing operation for fine-moving in a vertical direction which is parallel to an optical axis of the objective lens 43c or a tracking operation for finely-rotating in a direction which is perpendicular to the optical axis of the objective lens 43c, through the lens holder 43.

In general, a certain thickness t of an optical disk substrate, a certain laser light wavelength $\lambda$ and a certain numerical aperture NA, which is an optical characteristic of the objective lens, uniquely correspond. Therefore, when the thickness t of the optical disk substrate or the laser light wavelength $\lambda$ is changed, basically, the numerical aperture NA of the objective lens changes. Hence, compatible use is possible in only where the thickness t of the optical disk substrate is the same, unless, the objective lenses are designed for high flexibility and use with a large number of different NA with different laser light wavelengths.

FIGS. 2A to 2D are explanatory diagrams showing a combination between the thickness t of an optical disk substrate, a laser light wavelength and a numerical aperture of an objective lens. In an optical disk for recording and reproducing shown in FIG. 2A, the thickness t of the optical disk substrate is 1.2 mm, the laser light wavelength $\lambda$ is 785 nm or 685 nm, and an objective lens whose numerical aperture NA is 0.55 is used so as to be adaptable to any laser light wavelength.

In a compact disk for only reproduction shown in FIG. 2B, the thickness t of the optical disk substrate is 1.2 mm, the laser light wavelength $\lambda$ is 780 nm, and the numerical aperture NA of the objective lens is 0.45.

In a high-density optical disk of rewriting-type shown in FIG. 2C, having the thickness t of the optical disk substrate is 0.6 mm, the laser light wavelength $\lambda$ is 685 nm, and an objective lens whose numerical aperture NA is 0.6 is used. Further, in a DVD optical disk shown in FIG. 2D, having the thickness t of the optical disk substrate is 0.6 mm, the laser light wavelength $\lambda$ is 635 nm, and an objective lens whose numerical aperture NA is 0.55 is used.

It is not easy to prepare an optical disk apparatus comprising an objective lens whose numerical aperture NA is suitable for many combinations with a varying thickness t of an optical disk and a varying laser light wavelength $\lambda$. To deal with this, the following conventional techniques have been proposed.

FIG. 3 is a perspective view showing a conventional lens actuator which is disclosed in Japanese Patent Application Laid-Open No. 6-333255 (1994). Objective lenses 53 and 63 having absorption characteristics, which correspond to a plurality of types of disk-shaped optical recording mediums 51, respectively, are arranged in a tracking direction T. A beam 52 from a light source is guided into a beam separation mirror 55 through a beam splitter 54, whereby the beam is split into two beams which impinge upon the objective lenses 53 and 63, respectively.

A proper one of the objective lenses 53 and 63 which corresponds to the type of the disk-shaped optical recording medium 51 is judged on the basis of a focusing error information, and the objective lens 53 (or 63) which is identified is driven and controlled in a focusing direction F and the tracking direction T, on the basis of the focusing error information and a tracking error information.

However, since the beam from the light source is always split into two beams, optical quantity loss is large and it is necessary to have an accordingly large light source to obtain a necessary optical quantity.

FIG. 4 is a schematic diagram of a bi-focus optical head which is disclosed in preliminary reports for Association of Applied Physics, 19p-S-4. An objective lens 72 and a hologram element 73 are disposed with a predetermined distance therebetween within a mirror cylinder 74.

For example, 0-order diffracted light from the hologram element 73 is projected during reproduction on an optical disk 71 which includes a substrate having a thickness of 0.6 mm, while +1-order diffracted light from the hologram element 73 is projected during reproduction on the optical disk 71 which includes a substrate having a thickness of 1.2 mm.

With this structure, it is possible to deal with only two types of optical disks. Further, since one of the optical disks requires use of +1-order diffracted light, it is impossible to avoid deterioration of characteristics.

FIG. 5 is a perspective view of transparent plane plates 77 and 78 which are used in an optical information recording and reproducing apparatus which is disclosed in Japanese Patent Application Laid-Open No. 3-54740 (1991). The transparent plane plates 77 and 78 which have a successively varying thickness (See FIG. 5A) or a stepwise varying thickness (See FIG. 5B) so as to deal with a plurality of types of optical disks having different substrate thicknesses from each other, are disposed in an optical path, to thereby change an optical path length which is defined by the distance where light after passing through an objective lens travels until it reaches an optical disk surface. This makes it possible to converge light spots having less wave front aberration on the optical disk surface, and hence, to reproduce information from the optical disks which have different substrate thicknesses from each other.

This technique however requires to finely-rotate the transparent plane plate 77 or to finely-move the transparent plane plate 78, to position a portion thereof which has a proper thickness up to the optical axis, and therefore, there are problems that a function of positioning at a high accuracy is necessary, and that a transparent plane plate must be arranged in a small gap between the optical disk and the objective lens.

SUMMARY OF THE INVENTION

The present invention has been made to solve these problems, and one further object of the present invention is to provide a lens actuator which allows selection of one of a plurality of objective lenses in accordance with a combination of a substrate thickness of an optical disk and a laser light wavelength used, and to provide an optical disk apparatus comprising the lens actuator.

In a lens actuator and an optical disk apparatus according to the present invention, a lens holder holding a plurality of objective lenses which have different optical characteristics from each other on the same circumference around an axis is rotated by a rotation drive unit so as to position a proper objective lens to a predetermined position. This makes it possible to easily replace an objective lens with ineffective characteristics by switching the locations of the objective lenses until a proper objective lens is in place. This enables a lens actuator that can use increasing combinations of various substrate thicknesses of optical disks (photomagnetic recording mediums) on which recording and reproduction are to be performed, and various laser light wavelengths to be used. Therefore, it enhances the flexibility of the apparatus.

Another object of the present invention is to allow smooth switching of the objective lenses, for example, to enable replacement of an objective lens having a small numerical aperture which is one of the optical characteristics with another lens having the next numerical aperture. In other words, this device can replace one lens having a low recording density on an optical recording medium with another lens having the next higher recording density.

A lens actuator according to the present invention is characterized in that the objective lenses are arranged in the order of the value of numerical aperture. This makes it easy to replace an objective lens having a large numerical aperture with a progressively smaller numerical aperture, and hence, to accurately and smoothly select and adjust a proper objective lens on the basis of focusing error information and tracking error information.

Still another object of the present invention is to simplify the structure of the lens actuator.

A lens actuator according to the present invention is characterized in that the rotation drive unit for switching the lenses also serves as an orthogonal drive unit for finely moving the objective lenses in a tracking direction. Since components are commonly used, it is possible to reduce the types of parts, the overall size, and cost.

The lens actuator is characterized in that the objective lenses, the rotation drive unit and the orthogonal drive unit are arranged approximately on the same plane which is perpendicular to the optical axis. This reduces the overall height, the size of the structure, the mounting space, and cost.

Further, the lens actuator is characterized in that the rotation drive unit and the orthogonal drive unit consist of driving means utilizing electromagnetic force. This reduces the movable parts and improves the control accuracy. In addition, this reduces the number of problems, and makes it possible to use the lens actuator over the years, thereby to enhance the reliability.

The lens actuator is characterized as comprising position detecting means for detecting that the objective lens is positioned at the predetermined position. Hence, it is easy to recognize whether the objective lens is positioned at the predetermined position, to detect occurrence of a problem in the rotation drive unit, and to quickly replace the objective lenses with each other.

The above and further objects and features of the invention will more fully be apparent from the following detailed description with accompanying drawings.

DESCRIPTION OF THE PREFERRED EMBODIMENTS

In the following, the present invention will be described with reference to the drawings which show embodiment of the present invention.

<First Embodiment>

Figure 1:
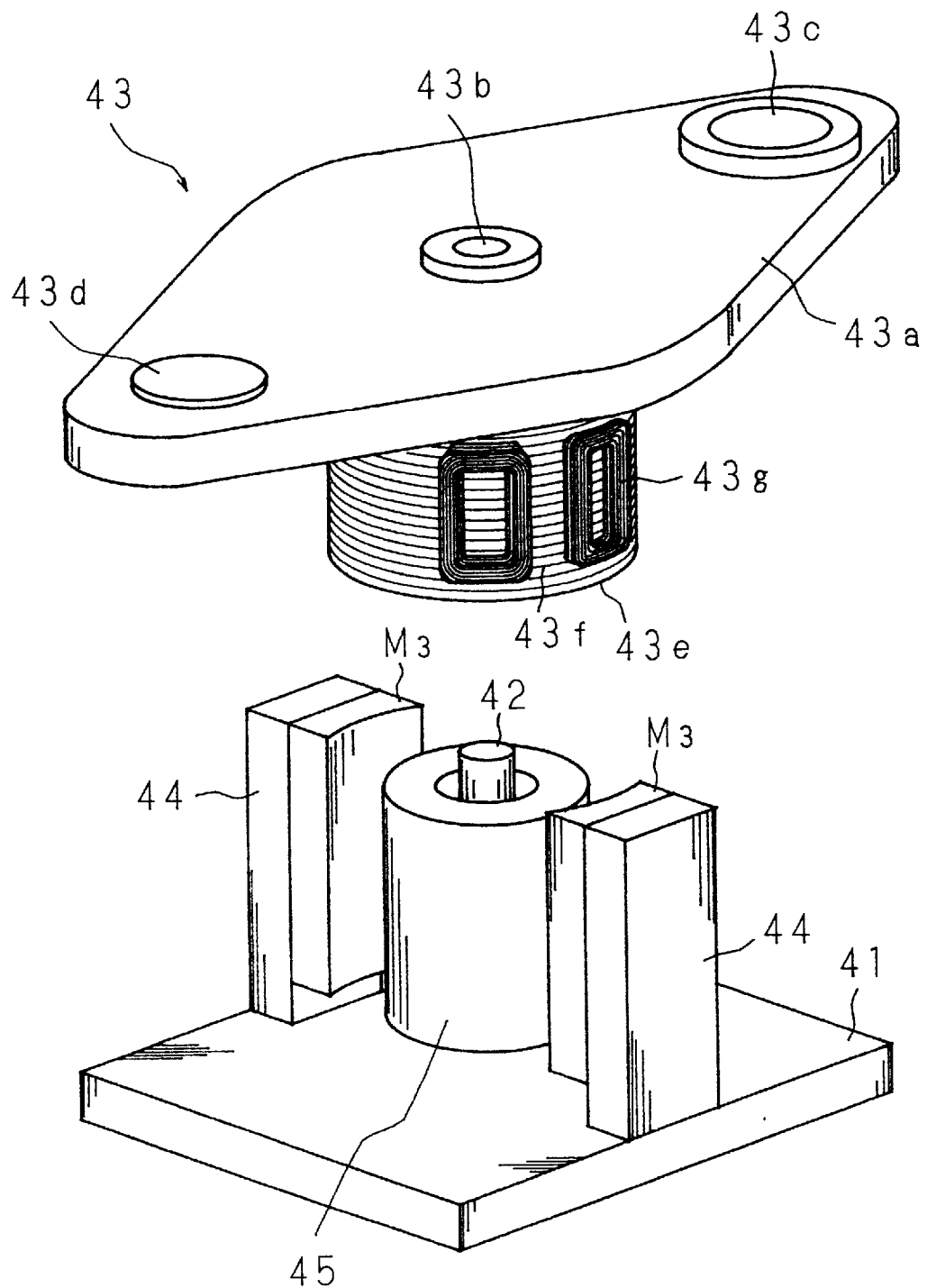
FIG. 1 is an exploded perspective view of a conventional lens actuator which does not have an objective lens switching function.
Figure 2A:
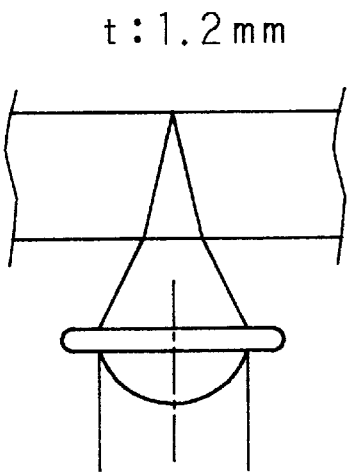
FIG. 2A is an explanatory diagram showing an example of a combination of the substrate thickness t of an optical disk, a laser light wavelength $\lambda$, and a numerical aperture NA of an objective lens.
Figure 2B:
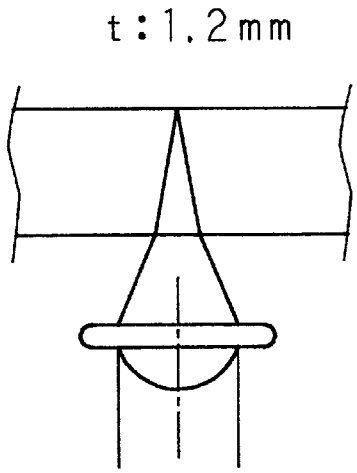
FIG. 2B is an explanatory diagram showing an example of a combination of the substrate thickness t of an optical disk, a laser light wavelength $\lambda$, and a numerical aperture NA of an objective lens.
Figure 2C:
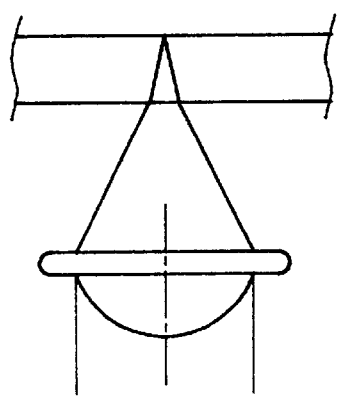
FIG. 2C is an explanatory diagram showing an example of a combination of the substrate thickness t of an optical disk, a laser light wavelength $\lambda$, and a numerical aperture NA of an objective lens.
Figure 2D:
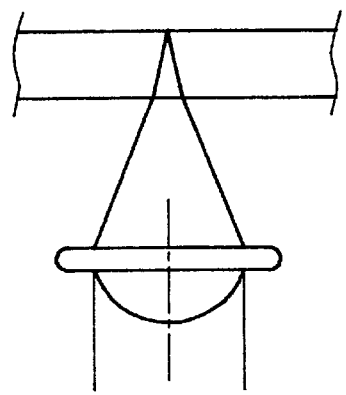
FIG. 2D is an explanatory diagram showing an example of a combination of the substrate thickness t of an optical disk, a laser light wavelength $\lambda$, and a numerical aperture NA of an objective lens.
Figure 3:
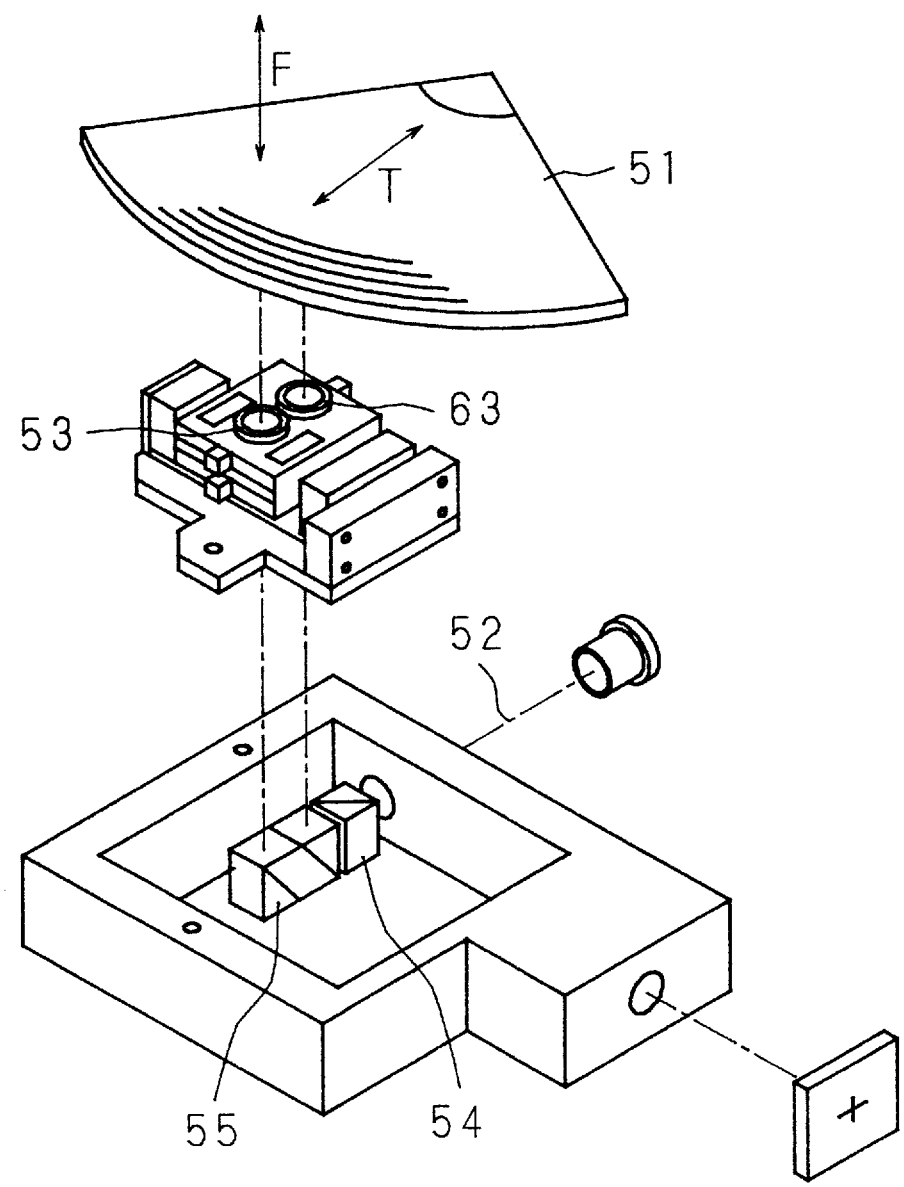
FIG. 3 is a perspective view of another conventional lens actuator.
Figure 4:
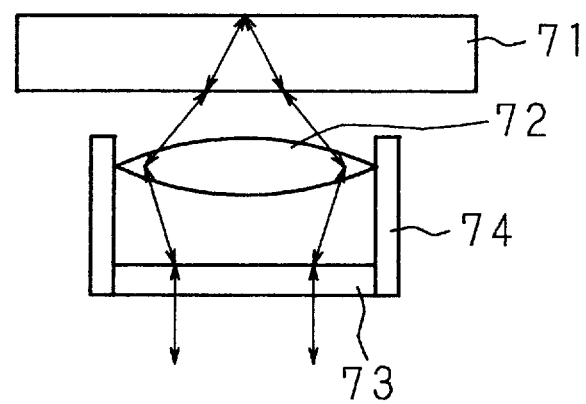
FIG. 4 is a perspective view of still another conventional lens actuator.
Figure 5A:
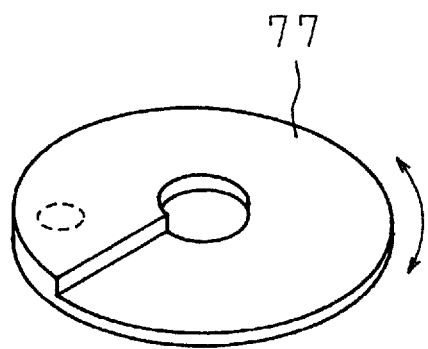
FIG. 5A is a perspective view of a transparent plane plate which is used in still another conventional lens actuator.
Figure 5B:
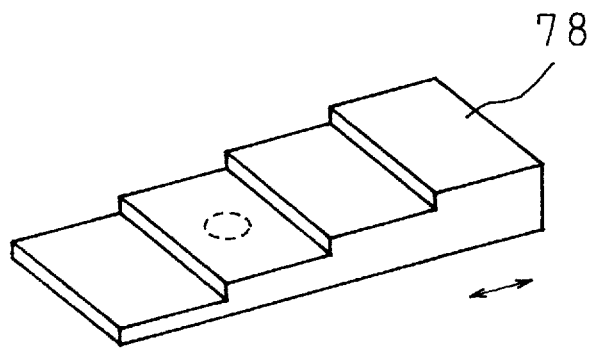
FIG. 5B is a perspective view of a transparent plane plate which is used in still another conventional lens actuator.
Figure 6:
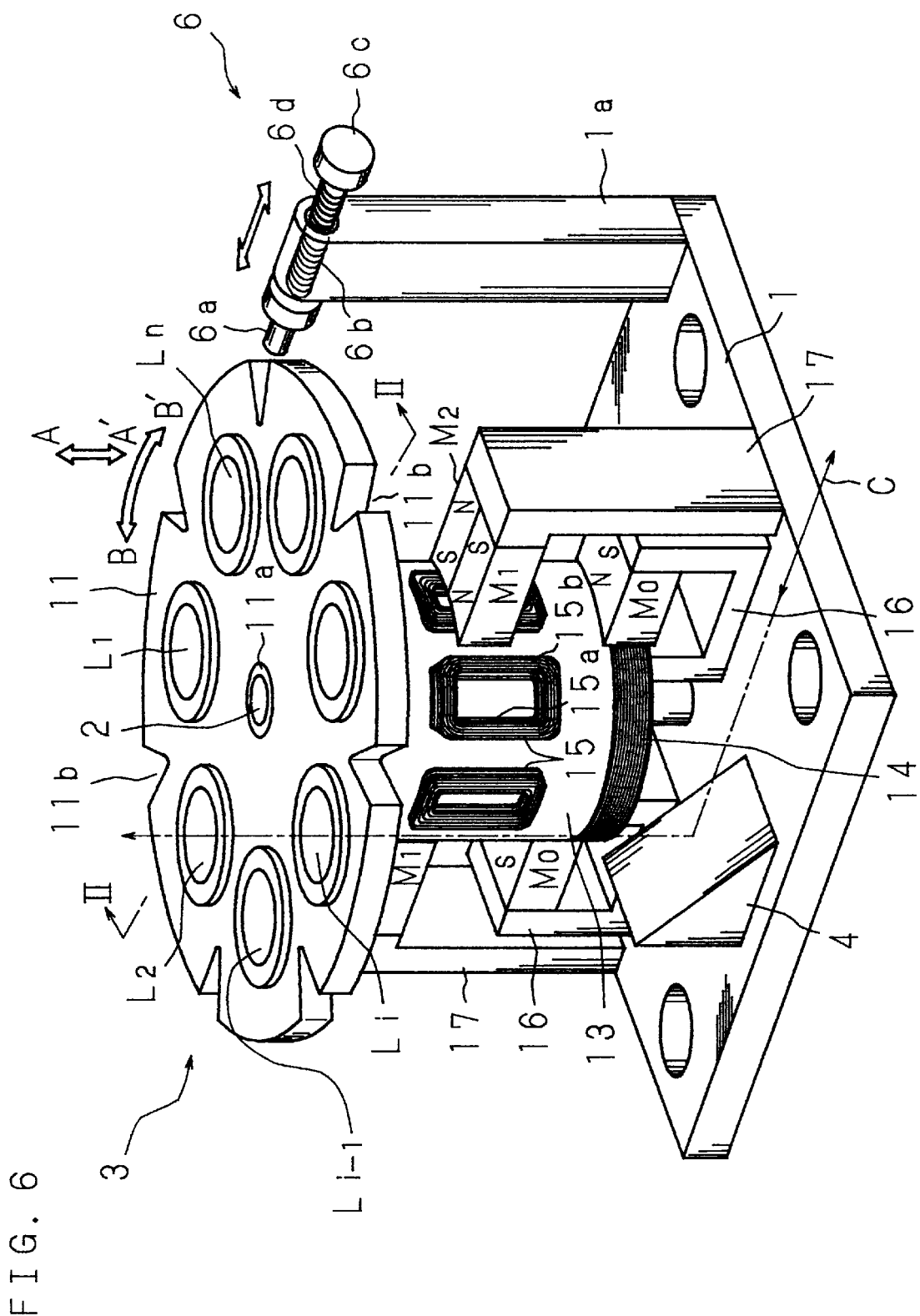
FIG. 6 is a perspective view of a lens actuator according to a first embodiment of the present invention.
Figure 7:
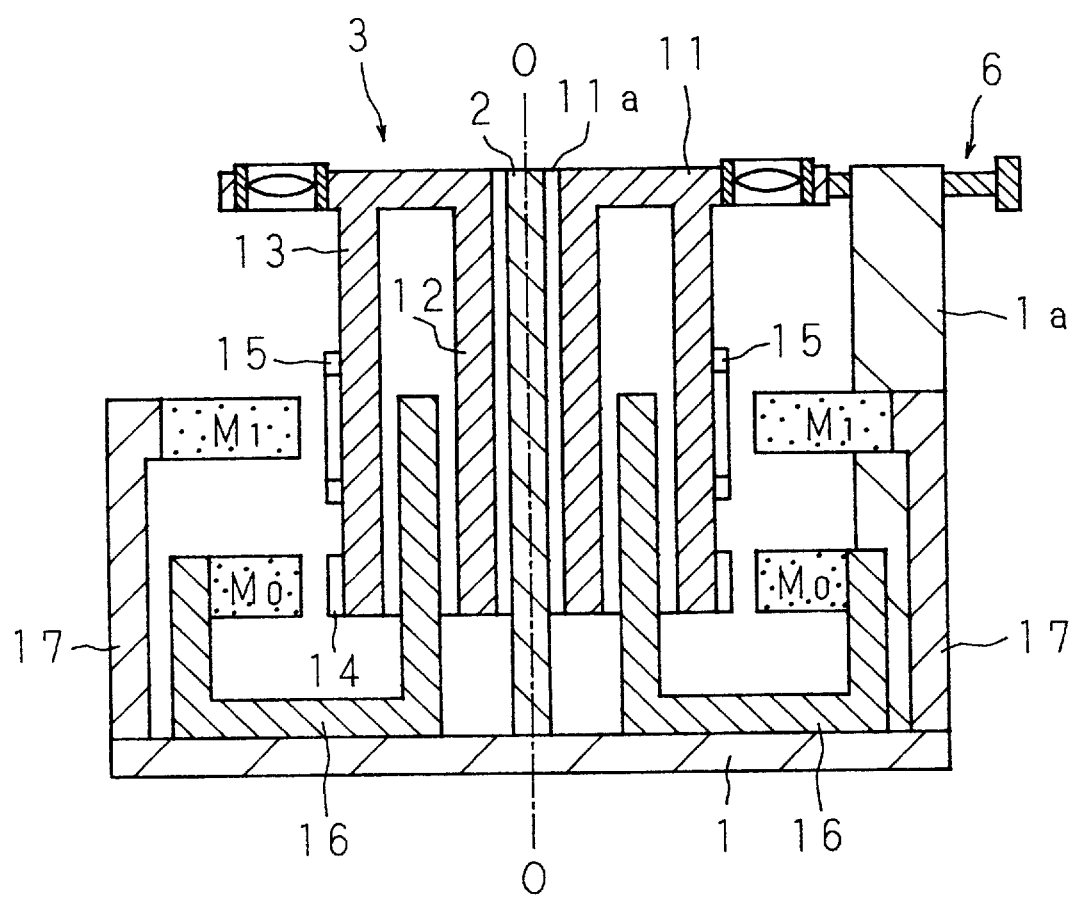
FIG. 7 is a vertical sectional view taken along II—II line in FIG. 6.

FIG. 6 is a perspective view of a lens actuator according to a first embodiment of the present invention, and FIG. 7 is a vertical sectional view taken along II—II line in FIG. 6. A guide shaft 2 having a smooth outer surface is disposed upright on a base 1, and a lens holder 3 is slidably fitted around the guide shaft 2 so as to enable the lens holder 3 to rotate and move in a vertical direction. An upward directing mirror 4 is disposed at an edge portion on the base 1.

The lens holder 3 has a structure in which an inner cylinder 12 having a smooth inner surface and an outer cylinder 13 are fixed on a bottom surface of a disk part 11, to be concentrical with the center of the disk part 11, as shown in FIG. 7. A hole 11a having the same diameter as the inner diameter of the inner cylinder 12 is formed at the center of the disk part 11, and the guide shaft 2 is slidably fitted with in the inner cylinder 12 and the hole 11a.

In the disk part 11, a plurality of objective lenses $L_1$, $L_2$ . . . $L_n$ which have different optical characteristics (numerical aperture NA) from each other are piercingly disposed concentrically around the hole 11a which is the center of rotation of the disk part 11, or an axial line 0—0 of the inner cylinder 12 (See FIG. 7), with about equal intervals, so that the optical axes of the objective lenses $L_1$, $L_2$ . . . $L_n$ are parallel to the axial line 0—0. Laser light C from a laser oscillator is reflected by the upward directing mirror 4 to enter into the objective lens $L_1$ which is positioned right above the upward directing mirror 4, and further impinge upon the optical disk, i.e., an optical recording medium.

The objective lenses which are disposed in the lens holder 3 are sequentially arranged, for example, as a first group for the substrate of the thickness t=1.2 mm and a second group for the substrate of the thickness t=0.6 mm, in accordance with the thickness of a substrate of a replaceable optical disk, and the objective lenses are preferably arranged in the order of the numerical aperture NA within each group. This is because when the objective lenses are to be switched with each other, it is easy to find a proper lens group if the objective lenses are switched with each other in such a manner that an objective lens having the smallest numerical aperture NA within each group is used for focusing error check and tracking error check, and because it is possible to perform switching smoothly even when the objective lenses are to be switched with each other within the same group.

Further, on the periphery of the disk part 11, V-shaped notches 11b are respectively formed in the intervals between the objective lenses $L_1$, $L_2$ . . . $L_n$, and a lens switching device 6 is disposed on the base 1 so that operation parts thereof correspond to the notches 11b.

The lens switching device 6 includes a support column 1a which is disposed upright on the base 1, and an operation rod 6a which is piercely supported on a top edge of the support column 1a with freedom of movement in a direction which is parallel to a tangential direction to the disk part 11. A solenoid coil 6b is disposed on an inner surface of the support column 1a which is penetrated by the operation rod 6a to support the same, a return spring 6d is disposed between a spring receiver 6c disposed at a rear edge of the operation rod 6a and the support column 1a. When a current is allowed to flow and is then blocked in the solenoid 6b, the operation rod 6a reciprocates in the direction of the arrow, and a tip of the operation rod 6a engages or parts with the notches 11b. This rotates the lens holder 3 by an angle which corresponds to one interval between the notches 11b around the guide shaft 2, whereby the objective lens $L_i$ positioned right above the upward directing mirror 4 is replaced in an order.

A focusing coil 14 is fixedly wound on a peripheral bottom surface of the outer cylinder 13 to be concentrical with the outer cylinder 13. Tracking coils 15 having a rectangular ring shape as viewed from the side are fixed on a peripheral center surface of the outer cylinder 13, respectively at positions which correspond to the lenses $L_1$ to $L_n$, so that the axial direction of the tracking coils 15 is set in a direction which is perpendicular to the axis of the outer cylinder 13.

Further, a pair of magnets (permanent magnets or electromagnets) $M_0$ are disposed at two positions in the diameter direction of the outer cylinder 13 through a pair of yokes 16, so as to each face a portion of the focusing coil 14. Another pairs of magnets (permanent magnets or electromagnets) $M_1$ and $M_2$ are disposed next to each other at the same two positions in the diameter direction through a pair of yokes 17, so as to each face a portion of the tracking coil 15.

The yokes 16 are similarly formed in a U-shape, and fixed on the base 1 with their top above as if to sandwich a bottom edge portion of the outer cylinder 13 and the focusing coil 14 from below, i.e., with one edge portions thereof located between the outer cylinder 13 and the inner cylinder 12, and with the other edge portions thereof located outside of the outer cylinder 13.

The magnets $M_0$ are fixed to inner surfaces of the other edge portions of the yokes 16, with the N poles (or S poles) faced to the focusing coil 14. To finely-move the lenses $L_1$ to $L_n$ in a direction which is parallel to the optical axes of the lenses $L_1$ to $L_n$ (a direction toward and away from the optical disk surface), a parallel drive unit which moves the lens holder 3 upward and downward along the guide shaft 2 has such a structure as described above.

By adjusting a current flowing in the focusing coil 14, the lens holder 3 is held along the guide shaft 2, at a predetermined height, in a floating state against the load of the lens holder 3. Further, by changing the value of the current, the lens holder 3 finely-moves along the guide shaft 2 in the A—A' arrow direction (vertical direction) in FIG. 6. In other words, the predetermined objective lens $L_i$ which is positioned right above the upward directing mirror 4 finely-moves in a direction which is parallel to the optical axis of the lens $L_i$, whereby the focal point of the objective lens $L_i$ is positioned on the optical disk.

In addition, the yokes 17 are equally I-shaped, and disposed upright on the base 1 outside of the outer cylinder 13 at such a height that top edge inner surfaces of the yokes 17 can face the tracking coils 15.

The magnets $M_1$ and $M_2$ are fixed to the top edge inner surfaces of the yokes 17 next to each other, so that N poles of the magnets $M_1$ and S poles of the magnets $M_2$ are directed toward the tracking coils 15 side. This forms an orthogonal drive unit for moving the objective lenses in a direction which is perpendicular to the optical axes of the objective lenses (i.e., tracking direction to the optical disk).

The sizes of the magnets $M_1$ and $M_2$ are determined so that under a condition where one of the magnets $M_1$ and $M_2$ faces one vertical direction portion 15a of the tracking coil 15, the other of the magnets $M_1$ and $M_2$ faces the other vertical direction portion 15b of the tracking coil 15.

When a current passes in one direction through one of the tracking coils 15 which face the magnets $M_1$ and $M_2$, the lens holder 3 rotates in the direction of the arrow B, whereas when a current passes through in an opposite direction, the lens holder 3 rotates in the direction of the arrow B'. That is, predetermined objective lens $L_i$ which is positioned right above the upward directing mirror 4 can move in the tracking direction with respect to the optical disk.

Now, an operation in the first embodiment will be described with reference to an example of a light modulation magneto-optic recording apparatus.

Laser light which is emitted from the laser oscillator and modulated in accordance with data to be recorded impinges upon the upward directing mirror 4 to be reflected thereat in an upright direction, guided into the lens $L_i$ to converge, and irradiated upon the optical disk surface. By adjusting a current which passes through the focusing coil 14, by means of an effect of the magnets $M_0$ which face the focusing coil 14 and the yokes 16, force is created which allow the lens holder 3 to finely-move along the guide shaft 2 in the vertical direction, whereby adjustment of the focal point is made possible. Further, by adjusting a current which passes through the tracking coils 15 while rotating the optical disk, the lens holder 3 finely-rotates around the guide shaft 2, whereby the position of the optical axis of the objective lens $L_i$ in the tracking direction is adjusted. A record mark is formed along a track in this manner.

Furthermore, during reproduction, reflection light from the optical disk surface is converged by the objective lens $L_i$, reflected in a horizontal direction by the upward directing mirror 4, and processed for reproduction.

When an optical disk having different substrate thickness is set, it is necessary to accordingly switch the objective lens $L_i$. For instance, when the objective lens $L_i$ is to be switched to an objective lens $L_{i-1}$, the solenoid coil 6b of the lens switching device 6 is conducted to move the operation rod 6a toward the lens holder 3 against the return spring 6d. This causes the tip of the operation rod 6a to engage with the notch 11b of the lens holder 3, so that the lens holder 3 is forced to rotate in the direction of the arrow B to place the lens $L_{i-1}$ to a position which faces the upward directing mirror 4.

When current-carrying for the solenoid coil 6b is cut off, the operation rod 6a is pulled back by the return spring 6d and gets separated from the lens holder 3.

Figure 8:
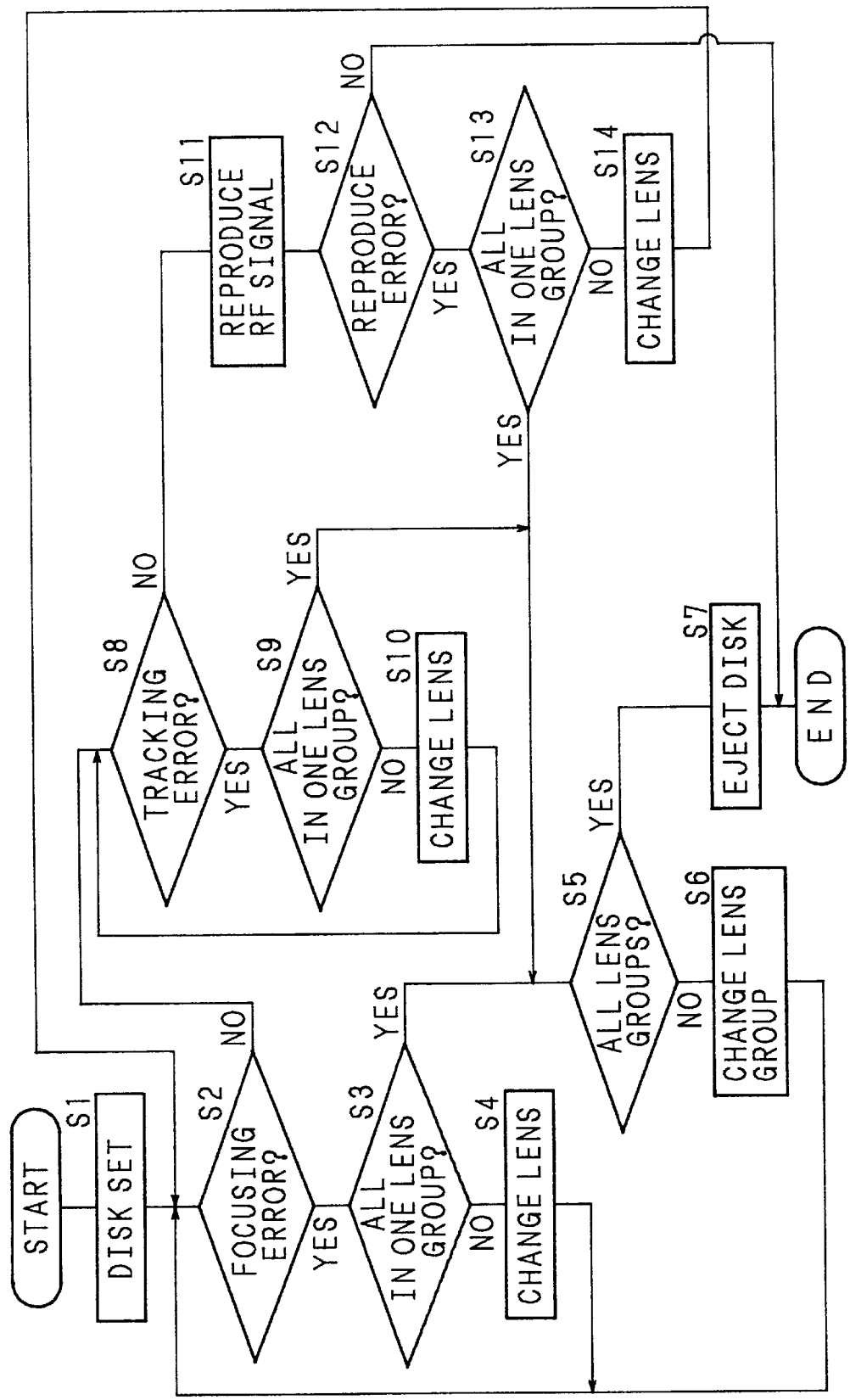
FIG. 8 is a flow chart showing a switching process of objective lenses.

FIG. 8 is a flow chart showing processes of switching the objective lenses.

First, when an optical disk is set in an optical disk apparatus (Step S1), the objective lens which has the smallest numerical aperture NA (in most cases) is initially set for operation. Then, a focusing error check is performed (Step S2).

When a focusing error is detected as a result of the focusing error check, whether the check is complete within the same group is judged (Step S3). When the check is not complete yet, the objective lens is replaced with an objective lens which has the next smallest numerical aperture NA (Step S4), and focusing error check is performed again after returning to Step S2. These procedures are repeated until a focusing error is not detected any more within the same group.

If focusing errors are detected on all objective lenses within the same group, i.e., all objective lenses which are used for optical disks which have a certain substrate thickness (Step S3), whether a check is complete for all groups is judged (Step S5). When a check is not complete yet, the lens group is replaced with another (Step S6), focusing error check is performed on each objective lens of this group after returning to Step S2. If focusing errors are detected on all objective lenses (Step S5), determining that this optical disk is not usable, the optical disk is ejected (Step S7).

When a focusing error is not detected in Step S2, tracking error check is performed in known procedure (Step S8). When a tracking error is detected as a result of the tracking error check, whether a check is complete within the same group is judged (Step S9). When a check is not complete yet, the objective lens is replaced with an objective lens which has the next smaller numerical aperture NA (Step S10), and these procedures are repeated until a tracking error is not detected any more after returning to Step S8.

When tracking errors are detected on all objective lenses within the same group at Step S9, after proceeding to Step S5, whether a check is complete for all groups is judged. When a check is not complete yet, the lens group is replaced with another (Step S6), and the procedure is re-started from the beginning after returning to Step S2.

When tracking errors are detected on all objective lenses as a result of the tracking error check (Step S5), determining that this optical disk is not usable, the optical disk is ejected (Step S7).

When there is an objective lens with no tracking error at Step S8, a reference (RF) signal which is prepared in advance is reproduced (Step S11), and whether there is a reproduction error is judged (Step S12).

If there is a reproduction error, whether a check is complete within the same group is judged (Step S13). When a check is not complete yet, the objective lens is replaced with another lens (Step S14). Focusing error check, tracking error check and reproduction error check are then repeated after returning to Step S2.

When there are reproduction errors on all lenses belonging to the same group at Step S13, the group is replaced after returning to Steps S5 and S6, and the procedure is re-started from the beginning after returning to Step S2.

When there are reproduction errors on all lenses (Step S5), determining that this optical disk is not usable, the optical disk is ejected (Step S6).

While the first embodiment is described in relation to a case where the objective lenses are selected in a trial-and-error manner according to the flow chart described above, this is not the only way to select lenses. Rather, an identification part, for instance, which displays the type of housed optical disks may be prepared in a portion of an optical disk cartridge. In this case, during setup of the optical disk apparatus, an optical sensor or a switch disposed to the optical disk apparatus detects the contents of the identification part, and a detection signal is outputted to a lens switching control part so as to select an objective lens in accordance with the detected characteristic. The lens switching control part automatically selects a proper objective lens in accordance with this signal, and rotates the lens holder 3 by reciprocally driving the lens switching device 6 until the objective lens is moved right above the upward directing mirror 4 to the predetermined position of the objective lens on the lens holder 3, whereby the desired objective lens is placed right above the upward directing mirror 4.

The identification part for identifying optical disks may be to set the reflection ratio of an exterior material of an optical disk at a constant position depending on a characteristic of the exterior material, to form holes which have different shapes in accordance with a characteristic of the exterior material, to assign a bar code, etc.

Further, an optical disk may have identifying information recorded repeatedly over a few (e.g. ten) tracks at a sufficiently low recording density, in the inner-most circumference, the outer-most circumference or both circumferences of an optical disk. When such an optical disk is set in the optical disk apparatus, the identifying information is initially reproduced using a lens with the smallest numerical aperture NA of the objective.

If reproduction fails, the objective lens is replaced with the objective lens which has the next smallest numerical aperture NA and reproduction is performed in a similar manner. When reproduction becomes possible, an objective lens which corresponds to the optical disk is selected, and switching to this objective lens is performed to thereby complete selection of the objective lens.

<Second Embodiment>

Figure 9:
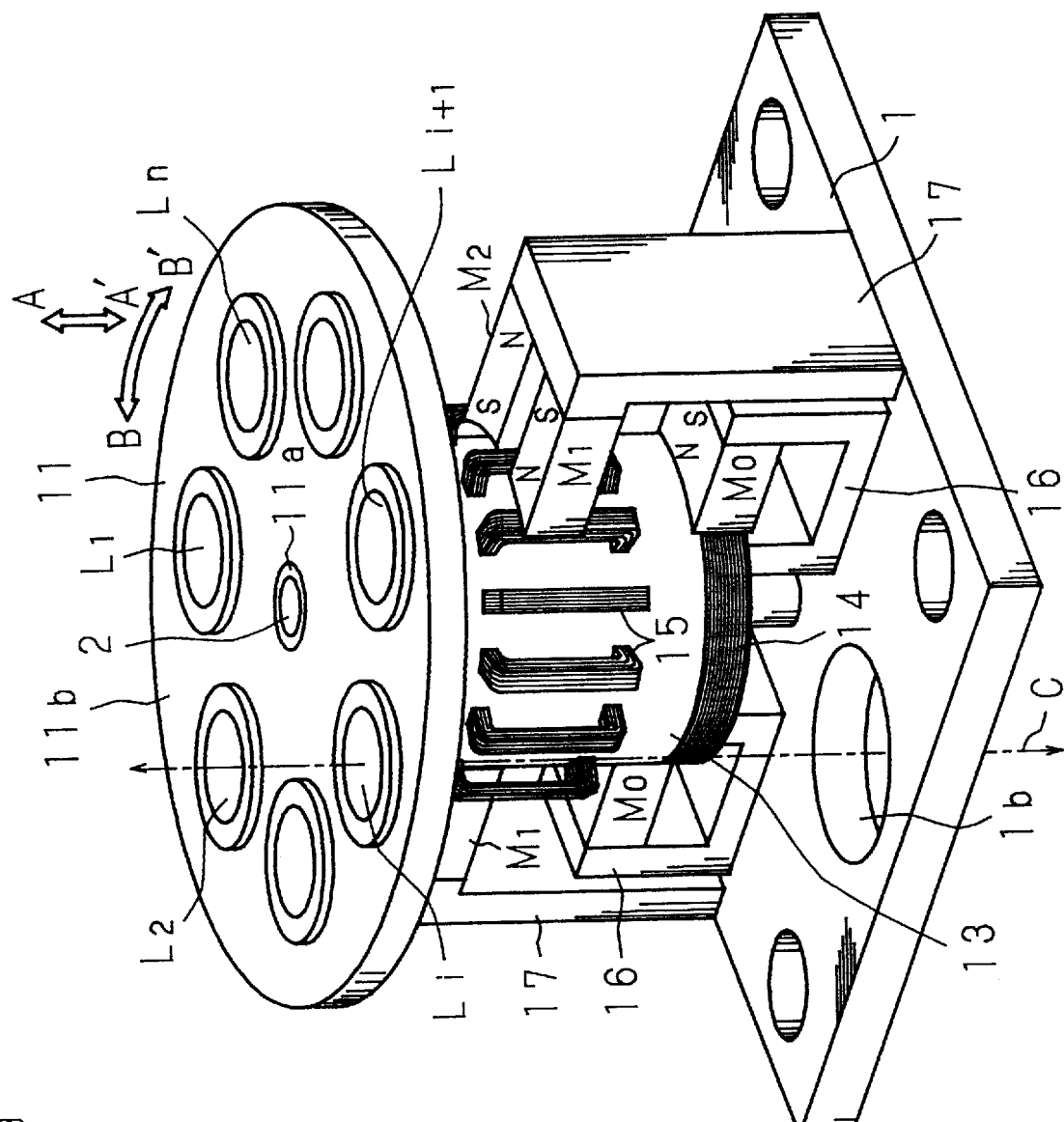
FIG. 9 is a perspective view of a lens actuator according to a second embodiment of the present invention.
Figure 10A:
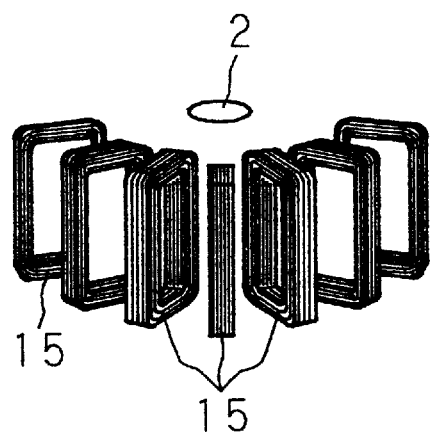
FIG. 10A is a perspective view showing an arrangement of tracking coils in the second embodiment.
Figure 10B:
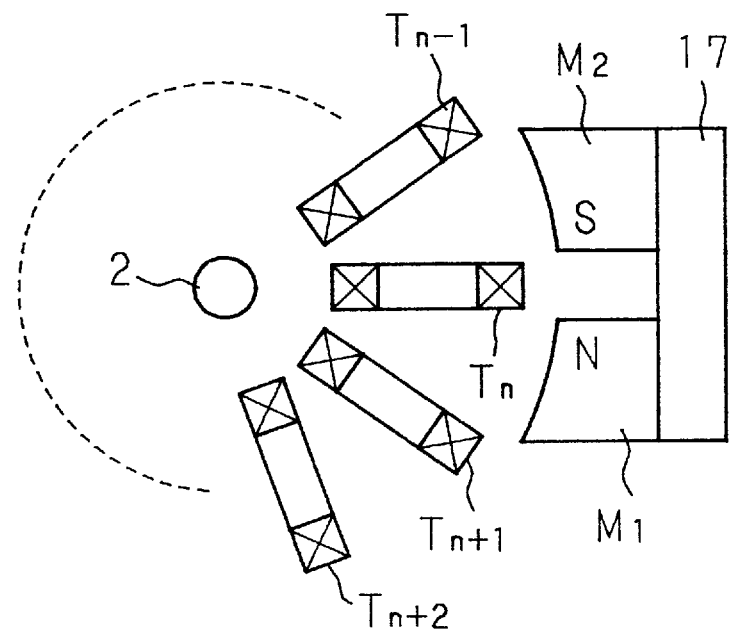
FIG. 10B is a plan view showing a relationship between tracking coils and a magnet in the second embodiment.

FIG. 9 is a perspective view showing a lens actuator according to a second embodiment, FIG. 10A is a perspective view showing an arrangement or the tracking coils, and FIG. 10B is a plan view showing a relationship between the tracking coils and the magnets $M_1$ and $M_2$. In the second embodiment, the orthogonal drive unit for moving the objective lenses in the direction which is perpendicular to the optical axes of the objective lenses (i.e., tracking direction on the optical disk), and the rotation drive unit for switching the objective lenses are a bi-functional structure. Hence, the lens switching device 6 which is used in the first embodiment is not used in the second embodiment. Further, there are no notches 11b at the periphery of the disk part 11.

Specifically, the bi-functional structure as above is realized in the following manner.

In the second embodiment, each of the tracking coils 15 is formed in a rectangular ring shape which elongates in a vertical direction. As shown in FIG. 10A, a pair of the tracking coils 15 is disposed to correspond to each one of the objective lenses $L_1$, $L_2$ ... $L_n$ so that the direction of the axial lines of the tracking coils 15 is held in a direction which is parallel to a tangential direction to the outer peripheral surface of the outer cylinder 13. The tracking coils 15 are fixed in such a manner that half the coils 15 penetrates into a peripheral wall or to an inner side of the peripheral wall of the outer cylinder 13.

The magnets $M_1$ and $M_2$ facing the tracking coils 15 are fixed on the top edges of the yokes 17 and on a surface of the side which faces the tracking coils 15, at intervals which are approximately the same as or somewhat smaller than the intervals between top ends of the tracking coils 15.

The number of the tracking coils 15 is an even number. In FIG. 10B, for instance, the tracking coils 15 are connected as divided into a unit including $T_{n-1}$, $T_{n+1}$ ... and a unit including $T_n$, $T_{n+2}$ ... so that the phase of every other tracking coil is the same.

In addition, the second embodiment does not use the upward directing mirror 4 which is used in the first embodiment. The laser light C directly impinges upon the objective lens $L_i$ through a hole 1b formed in the base 1. After convergence by the objective lens $L_i$, reflection light from the optical disk surface is made available through the hole 1b.

Next, operation in the second embodiment will be described.

When the objective lens $L_i$ is to be replaced with the objective lens $L_{i+1}$, a current having a negative phase is applied to each of the pair of the tracking coils 15 of each unit.

Meanwhile, when the objective lens is to be finely-rotated by the orthogonal drive unit, a current is applied only to the tracking coil $T_n$ which is positioned to face the magnets $M_1$ and $M_2$. Alternatively, currents having the same phases may be applied to the coils of the both units.

The other structure and operations are substantially the same as in the first embodiment, and therefore, a description will be omitted with identical numbers assigned to corresponding portions.

<Third Embodiment>

Figure 11:
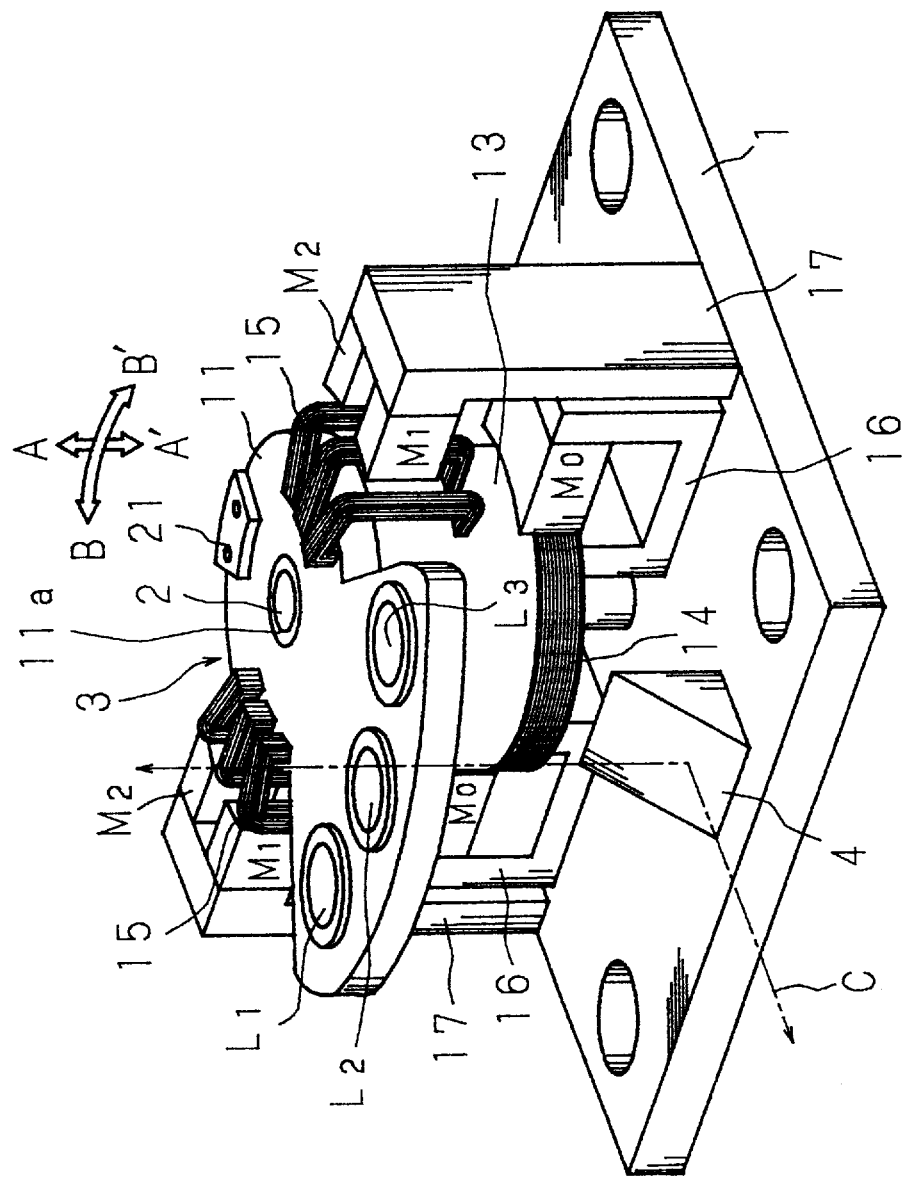
FIG. 11 is a perspective view of a lens actuator according to a third embodiment of the present invention.

FIG. 11 is a perspective view showing a lens actuator according to a third embodiment. In the third embodiment, for a large part of the disk part 11 of the lens holder 3, the diameter of the disk part 11 is reduced to approximately the same as the outer diameter of the outer cylinder 13, leaving a portion of the disk part 11 of the circumferential direction in the shape of a fan. In the portion which projects in the shape of a fan, a plurality of (three, for instance) objective lenses $L_1$, $L_2$ and $L_3$ which have different optical characteristics (numerical aperture NA) from each other are disposed approximately at constant intervals in the circumferential direction, so that the optical axes of the objective lenses are parallel to the axial line of the hole 11a.

With respect to the center of rotation, at an edge of a portion on the opposite side of the fan-like projecting portion, a weight balancer 21 is fixed whose weight corresponds to the weight of the entire fan-like projecting portion.

At two positions in a diameter direction in a region which has a reduced diameter within the disk part 11 on both sides of the weight balancer 21, a plurality of tracking coils 15 which are similar to those used in the second embodiment are disposed so that the direction of the axial lines of the coils is parallel to the tangential direction to the outer peripheral surface of the outer cylinder 13.

This maintains the lens holder 3 and the top surface of the tracking coils 15 approximately on the same plane in a direction which is perpendicular to the guide shaft 2.

To correspond to the number of the objective lenses $L_1$, $L_2$ and $L_3$, there are three tracking coils 15 on either side of the outer cylinder 13. The insertion angle θ of the hole 11a with respect to the axial lines is set equal to the insertion angle of each one of the objective lenses $L_1$, $L_2$ and $L_3$.

Six tracking coils 15, i.e., two for each objective lens $L_1$, $L_2$ and $L_3$ may be disposed on each side.

Now, an operation in the third embodiment will be described.

The laser light C impinges upon the objective lens $L_2$ which is located right above the upward directing mirror 4, to be converged and guided onto the optical disk. A focusing operation on the objective lens $L_2$ in a direction which is parallel to the optical axis of the objective lens $L_2$ and a tracking operation on the objective lens $L_2$ in a direction which is perpendicular to the optical axis of the objective lens $L_2$ are substantially the same as those in the second embodiment.

Since the weight of the lens holder 3 about the center of rotation is balanced by the balancer 21, the lens holder 3 rotates smoothly.

In the third embodiment, since the tracking coils 15 are disposed all over the top surface ranging from the outer cylinder 13 to a top of the disk part 11, the thickness of the entire lens holder 3 in the vertical direction is reduced, thereby realizing a compact structure.

<Fourth Embodiment>

Figure 12:
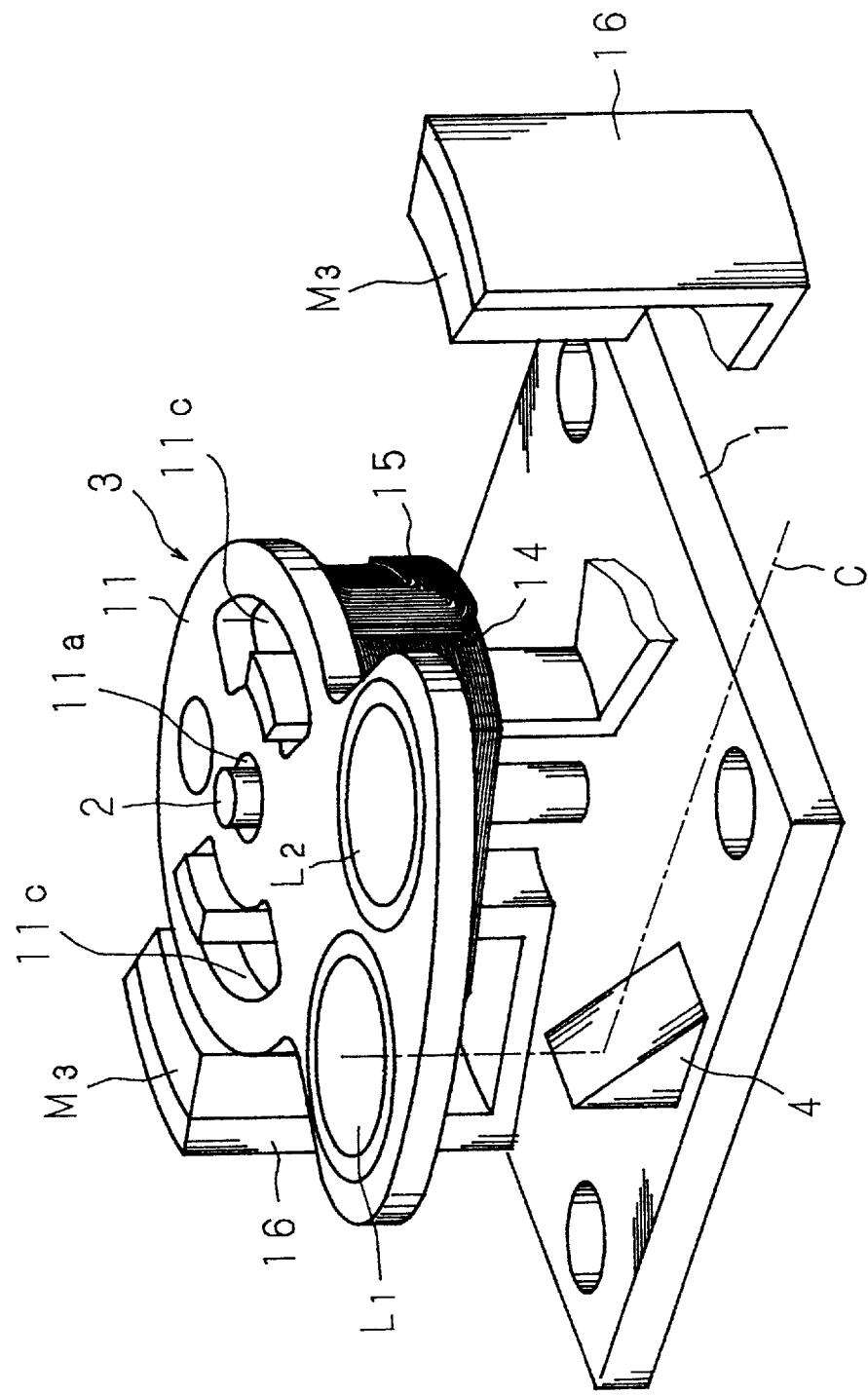
FIG. 12 is a partially-notched perspective view of a lens actuator according to a fourth embodiment of the present invention.
Figure 13A:
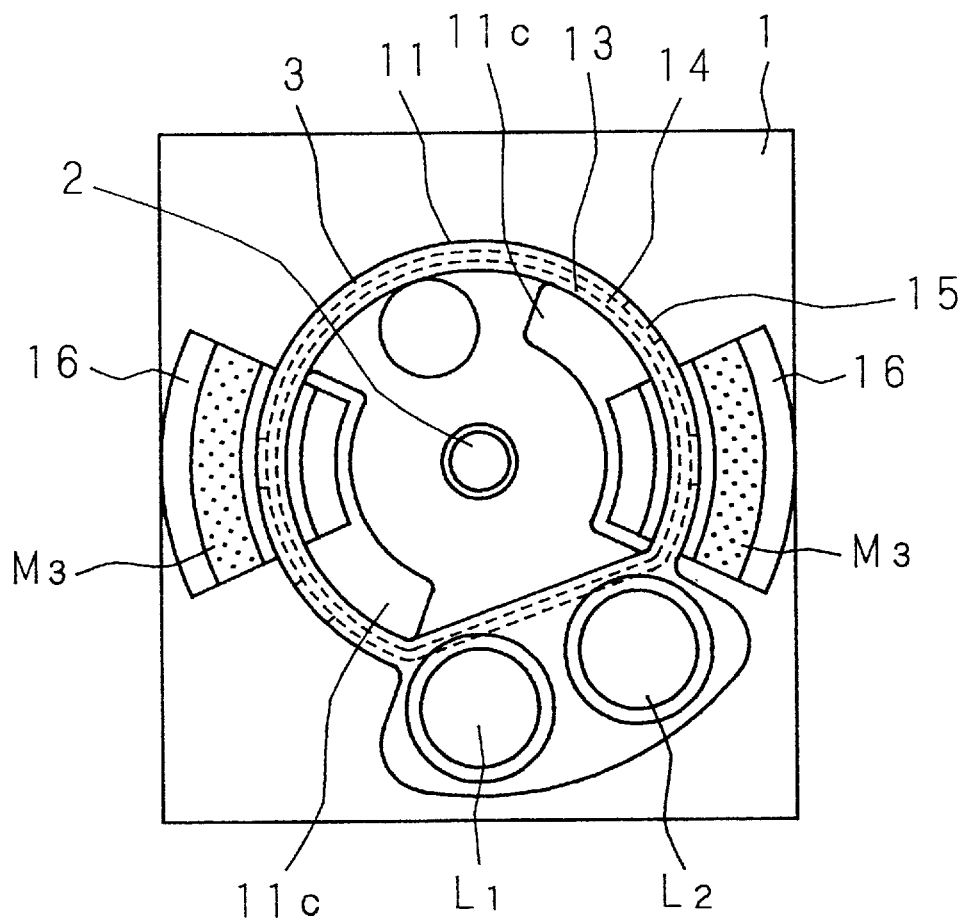
FIG. 13A is a plan view showing the lens actuator in the fourth embodiment.
Figure 13B:
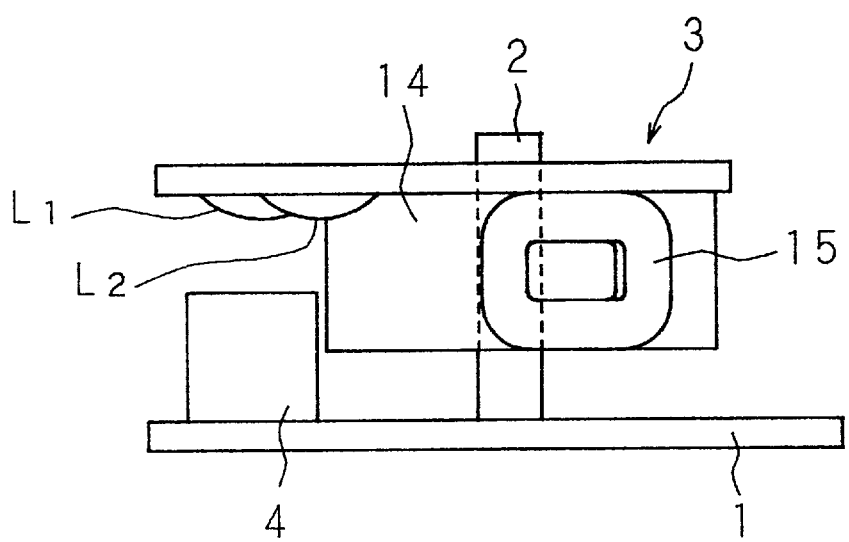
FIG. 13B is a side view showing the lens actuator in the fourth embodiment.
Figure 14A:
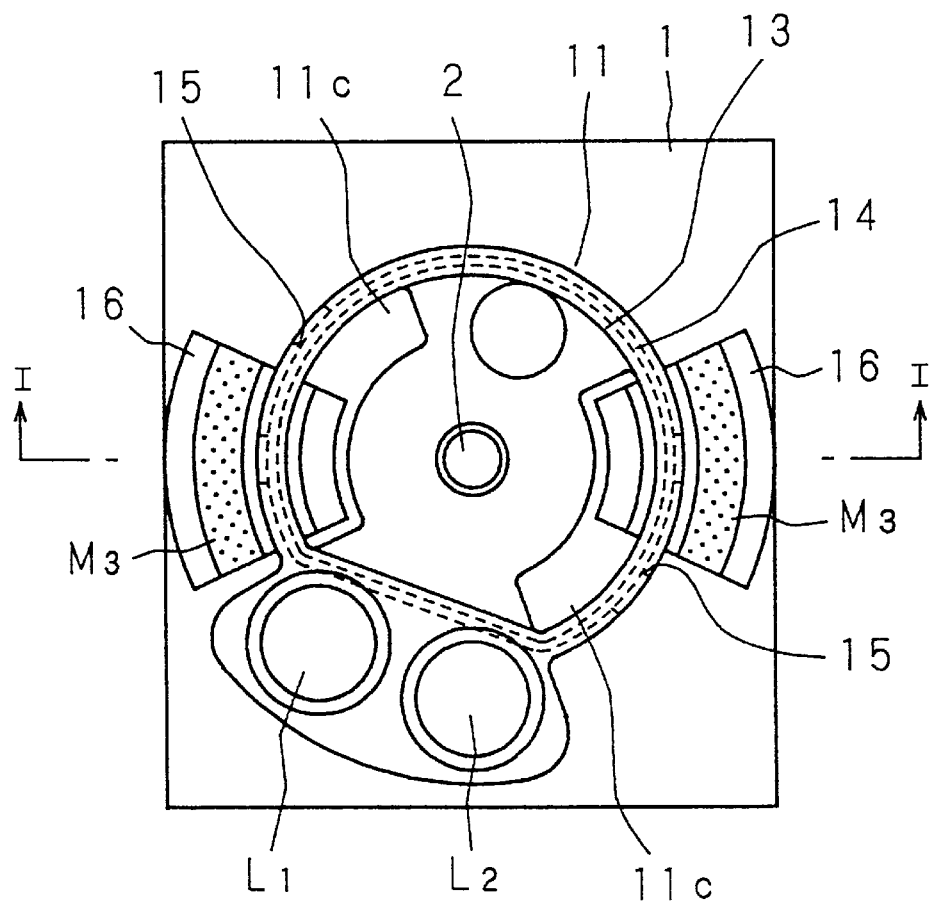
FIG. 14A is a plan view showing a condition after switching lenses in the fourth embodiment.
Figure 14B:
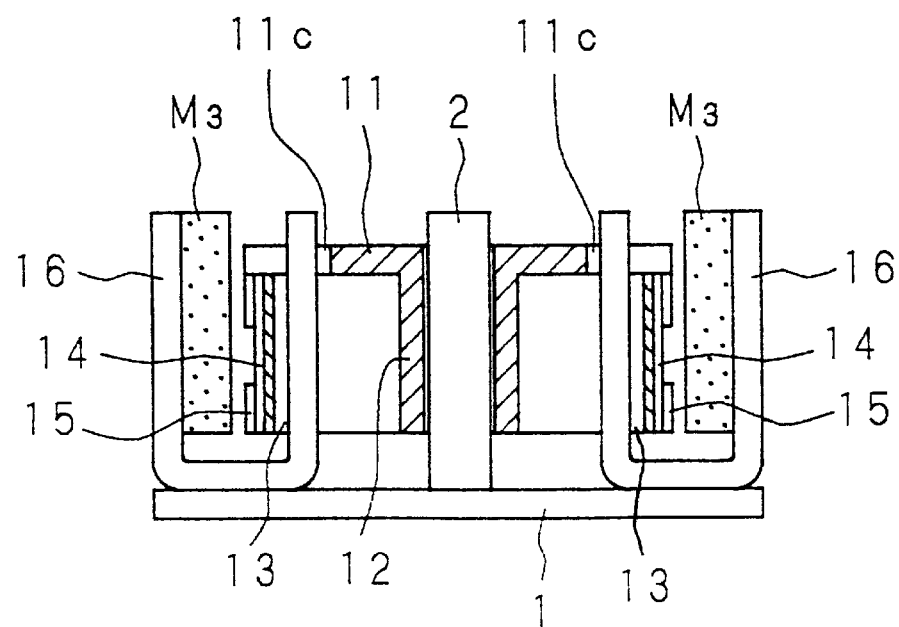
FIG. 14B is a vertical sectional view taken along I—line in FIG. 14A.

FIG. 12 is a partially-notched perspective view showing a lens actuator according to a fourth embodiment, FIG. 13A is a plan view of the same, FIG. 13B is a side view with the yokes removed, FIG. 14A is a plan view with lens L, replaced with lens $L_2$, and FIG. 14B is a vertical sectional view taken along I—I line in FIG. 14A.

The disk part 11 except for the fan-like projecting portion is reduced to approximately the same as the outer diameter of the outer cylinder 13, as in the third embodiment. In the fan-like projecting portion, two objective lenses $L_1$ and $L_2$ which have different optical characteristics (numerical aperture NA) from each other are disposed to be concentrical with respect to the hole 11a.

In the fourth embodiment, the top surface of the lens holder 3 is approximately flush with the top surface of the tracking coils 15, the lens holder 3 has a low height in the vertical direction so that the entire structure is compact.

In the fourth embodiment, the arc-shaped magnets $M_3$ which are disposed to the yokes 16 serves as the magnets facing the focusing coil 14 and the tracking coils 15.

As shown in FIGS. 13A and 14A, one side of the yokes 16 which are located inside the outer cylinder 13 and the other side of the yokes 16 which are located outside the outer cylinder 13 are both concentrical arc-shaped with respect to the center of the guide shaft 2. The one side of the yokes 16 protrude from arc-shaped openings 11c which are formed in the disk part 11, so that the height of the lens holder 3 as a whole is lowered to realize a compact structure.

While the outer cylinder 13 is cylindrically shaped in the portion which corresponds to the region of the disk part 11 having a reduced diameter, the portion of the outer cylinder 13 which faces the fan-like projecting portion has a configuration which is flattened. The focusing coil 14 is wound around the outer cylinder 13 approximately all over the length in the axial direction. At two positions in the diameter direction, the tracking coils 15 are each fixed to the outer periphery of the focusing coil 14.

In the fourth embodiment as described above, when the objective lenses are to be replaced with each other, the maximum current is applied to the tracking coils 15 for only a short period of time, and following this, the lens holder 3 is rotated utilizing inertia.

To stop the rotation of the lens holder 3, when an effective portion of the tracking coil 15 is replaced, a proper current of the tracking coil direction is applied to the same. Since the effective portion of the tracking coil 15 is different, i.e., opposite to the polarity of the magnet $M_3$, braking force works on the lens holder 3.

Further, when the objective lenses are to be replaced with each other at a high speed, the maximum current is applied to the tracking coils 15 for only a short period of time, a current of a reverse direction is then applied when half the effective portion of the tracking coil 15 passes the magnet $M_3$ to rotate the lens holder 3.

Breaking is as described above.

<Fifth Embodiment>

Figure 15A:
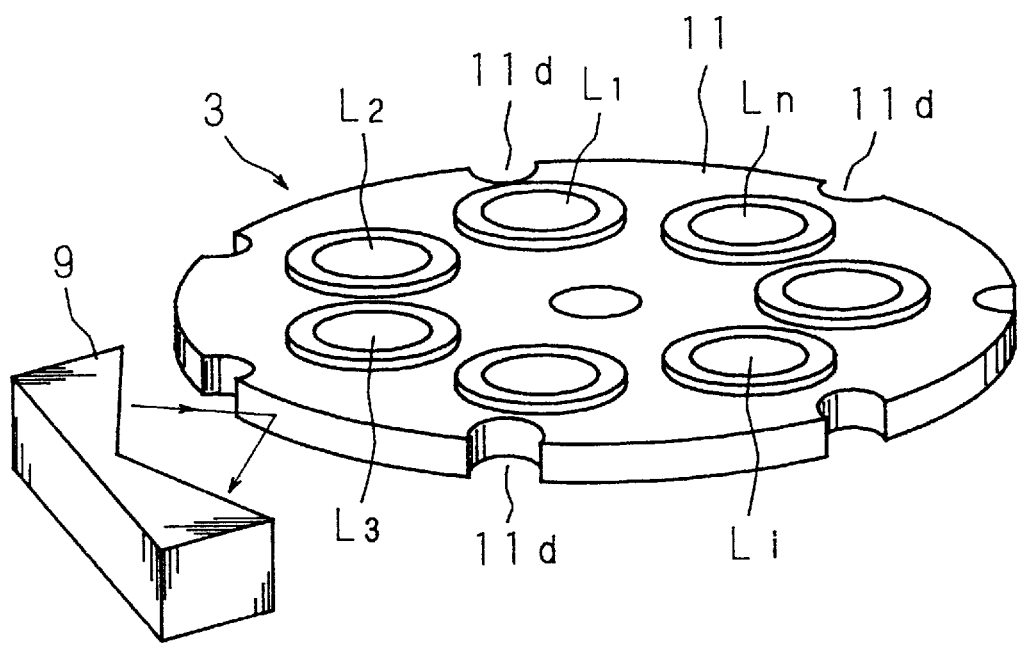
FIG. 15A is a schematic perspective diagram showing a main portion of a lens actuator according to a fifth embodiment.
Figure 15B:
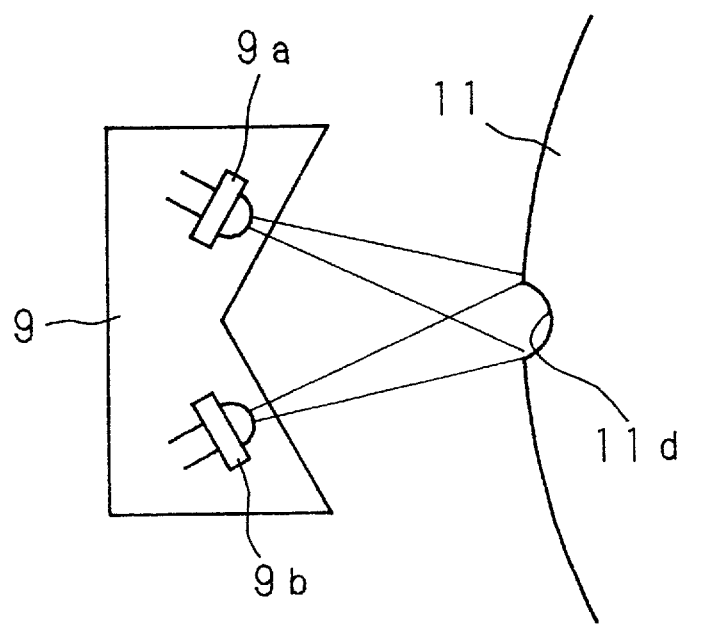
FIG. 15B is a schematic plan diagram showing the main portion in the fifth embodiment.

FIGS. 15A and 15B are schematic diagrams of a lens holder of a lens actuator according to a fifth embodiment of the present invention. At positions on a side peripheral surface of the disk part 11 which pass through central portions of the objective lenses $L_1$, $L_2$ . . . $L_n$ in a radius diameter, semi-arc concave surfaces 11d are formed. In addition, a position detector 9 is disposed to face the side peripheral surface of the disk part 11 of the lens holder 3.

A light emitting element 9a and a light receiving element 9b of the position detector 9 are disposed at a predetermined angle inclined to face the same position on the side peripheral surface of the disk part 11.

When the concave surfaces 11d of the disk part 11 are positioned within the fields of view of the light emitting element 9a and the light receiving element 9b, light from the light emitting element 9a is reflected at the concave surfaces 11d and received by the light receiving element 9b, whereby it is confirmed that the objective lens is positioned at a predetermined position.

The fifth embodiment may be combined with any one of the first to the fourth embodiments described earlier.

In addition, the lens actuator according to the invention is adaptable to an optical disk apparatus wherein recording/reproduction operation is performed in an optical or a magneto-optical method, as described above.

As this invention may be embodied in several forms without departing from the essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A lens actuator, comprising:
a lens holder for holding a plurality of objective lenses which have different optical characteristics from each other;
a parallel drive unit for moving the lens holder along an axis which is parallel to optical axes of the objective lenses; and
a multiple use drive unit for rotating the lens holder about said axis so as to move the objective lenses in a direction which is perpendicular to the optical axes of the objective lenses, thereby switching an objective lens to a predetermined position, and for fine positioning of said objective lens,
wherein said objective lenses are disposed on a circumference whose center coincides with said axis on the lens holder.

2. The lens actuator of claim 1, wherein said objective lenses are arranged in an order of the value of numerical aperture which is an optical characteristic.

3. The lens actuator of claim 2, wherein said multiple use drive unit is formed by a drive means which utilizes electromagnetic force.

4. The lens actuator of claim 2, further comprising position detecting means for detecting that said objective lens is positioned at a predetermined position.

5. The lens actuator of claim 1, wherein said objective lenses and said multiple use drive unit are arranged to be approximately on a single plane which is perpendicular to said axis.

6. The lens actuator of claim 5, wherein said multiple use drive unit is formed by a drive means which utilizes electromagnetic force.

7. The lens actuator of claim 5, further comprising position detecting means for detecting that said objective lens is positioned at a predetermined position.

8. The lens actuator of claim 1, wherein said multiple use drive unit is formed by drive means which utilizes electromagnetic force.

9. The lens actuator of claim 8, further comprising position detecting means for detecting that said objective lens is positioned at a predetermined position.

10. The lens actuator of claim 1, further comprising position detecting means for detecting that said objective lens is positioned at a predetermined position.

11. The lens actuator of claim 1, wherein notched portions are formed in a peripheral portion of the lens holder, to correspond to said objective lenses, and
said rotation drive unit includes:
an operation rod which reciprocally moves in a tangential direction to a rotatable area of a notched portions; and
reciprocal movement controlling means for reciprocally moving between a position at which the operation rod engages with said notched portions and a position at which the operation rod does not engage with said notched portions, to thereby rotate the lens holder.

12. The lens actuator of claim 11, wherein said reciprocal movement controlling means includes a solenoid coil and conducting means for conducting the solenoid coil.

13. An optical disk apparatus comprising a lens actuator having:
a lens holder for holding a plurality of objective lenses which have different optical characteristics from each other;
a parallel drive unit for moving the lens holder along an axis which is parallel to optical axes of the objective lenses; and
a multiple use drive unit for rotating the lens holder about said axis so as to move the objective lenses in a direction which is perpendicular to the optical axes of the objective lenses, thereby switching said objective lens to a predetermined position, and for fine positioning of said objective lens,
wherein said objective lenses are disposed on a circumference whose center coincides with said axis on the lens holder.

14. An optical disk apparatus of claims 13, wherein said objective lenses are arranged in an order of the value of numerical aperture which is an optical characteristic.

15. An optical disk apparatus of claim 13, wherein said objective lenses and said multiple use drive unit are arranged to be approximately on a single plane which is perpendicular to said axis.

16. An optical disk apparatus of claim 13, wherein said multiple use drive unit is formed by a drive means which utilizes electromagnetic force.

17. An optical disk apparatus of claim 13, wherein the lens actuator further includes a position detecting means for detecting that said objective lens is positioned at a predetermined position.

* * * * *

UNITED STATES PATENT AND TRADEMARK OFFICE
CERTIFICATE OF CORRECTION

PATENT NO. : 5,815,328
DATED : September 29, 1998
INVENTOR(S) : Akihiko Makita

It is certified that error appears in the above-identified patent and that said Letters Patent is hereby corrected as shown below:

Column 4, line 3, after "next" insert

--higher--

Column 5, line 34, delete "I-" and insert

-- I-I -- therefor

Column 11, line 47, delete "lens L," and insert -- Lens $L_1$ -- therefor

Column 12, line 22, delete "same" and insert

--tracking coil-- therefor

Signed and Sealed this

Twentieth Day of July, 1999

*Attest:*

Q. TODD DICKINSON

*Attesting Officer*  *Acting Commissioner of Patents and Trademarks*